(12) United States Patent
Shimbo et al.

(10) Patent No.: US 6,181,563 B1
(45) Date of Patent: *Jan. 30, 2001

(54) METER DEVICE FOR VEHICLE

(75) Inventors: Yasuo Shimbo; Shigeaki Tamura, both of Nagaoka (JP)

(73) Assignee: Nippon Seiki Co., Ltd., Nagaoka (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/117,778

(22) PCT Filed: Aug. 21, 1997

(86) PCT No.: PCT/JP97/02914

§ 371 Date: Aug. 6, 1998

§ 102(e) Date: Aug. 6, 1998

(87) PCT Pub. No.: WO98/26254

PCT Pub. Date: Jun. 18, 1998

(30) Foreign Application Priority Data

Dec. 12, 1996 (JP) .................................................. 8/331938

(51) Int. Cl.$^7$ ............................. H01R 13/66; B60K 37/02
(52) U.S. Cl. .......................................... 361/736; 307/10.1
(58) Field of Search ...................................... 307/9.1, 10.1, 307/10.2; 340/439, 466, 825, 69, 936, 988, 993, 994; 73/117.2, 117.3; 701/29, 33, 35; 455/158.4, 186.1, 186.2, 345; 361/736, 756, 796, 784, 785

(56) References Cited

U.S. PATENT DOCUMENTS

| 5,154,617 |   | 10/1992 | Suman et al. . |
| 5,239,700 | * | 8/1993  | Guenther et al. . |
| 5,353,190 |   | 10/1994 | Nakayama et al. . |
| 5,475,566 | * | 12/1995 | Rada et al. . |
| 5,663,866 | * | 9/1997  | Ichikawa . |
| 5,884,202 | * | 3/1999  | Arjomand . |
| 5,916,287 | * | 6/1999  | Arjomand et al. . |

FOREIGN PATENT DOCUMENTS

| 2 276 038 | 9/1994 | (GB) . |
| 2-45238   | 2/1990 | (JP) . |
| 6-276571  | 9/1994 | (JP) . |
| 6-276644  | 9/1994 | (JP) . |
| 7-47869   | 2/1995 | (JP) . |
| 7-96774   | 4/1995 | (JP) . |
| 7-203553  | 8/1995 | (JP) . |

* cited by examiner

Primary Examiner—Gerald Tolin
(74) Attorney, Agent, or Firm—McDermott, Will & Emery

(57) ABSTRACT

A vehicle instrumentation system comprising a meter block having a display portion, a control portion, and a power supply portion. The display portion provides a display according to signals from the electronic component units. The control portion controls the electronic component units. The electric power supply portion supplies electric power to the electronic component units. These electronic component units are obtained by classifying and integrating electronic components other than the meter block. A mounting reference portion permits the meter block and the electronic component units to be attached and detached.

3 Claims, 2 Drawing Sheets

METER DEVICE FOR VEHICLE

TECHNICAL FIELD

The present invention relates to a vehicle instrumentation system and, more particularly, to fabrication of electronic component units in a vehicle by classification and integration and to an associated structure of instrumentation system.

BACKGROUND ART

In a vehicle, various electronic components and devices, such as a computer for measuring time, an illuminated key entry system, a defogger timer, a seat belt warning system, a light turning-off reminding warning system, a key takeout reminding warning system, a power door lock, and a keyless entry system, are independently installed and distributed. These electronic components are electrically connected with a meter block mounted in front of the driver's seat. The electronic components are controlled by system means such as a microcomputer incorporated in the meter block in accordance with a program previously stored in a ROM of the meter block. The state of the vehicle detected by the electronic components is displayed on the meter block if necessary (for example, see Japanese Unexamined Patent Publication No. 203553/1995.)

Integration of the distributed independent electronic components is considered as means for achieving cost reduction. The combination of the required electronic components differs according to the vehicular specifications for specific climatic areas or the vehicle grade. Therefore, if electronic components are integrated simply according to the combination, then the number of variations increases. Consequently, large cost reduction cannot be expected.

Japanese Unexamined Patent Publication No. 276571/1994 discloses a multiplexed transmission device for a vehicular electric system. This multiplexed transmission device is separate from electronic components, unlike the prior art device. Since these two kinds of systems can be separately developed and manufactured, it is possible to prevent the electronic components and the multiplexed transmission device from increasing in total number. Even with this structure, however, the number of variations described above cannot be sufficiently decreased.

DISCLOSURE OF THE INVENTION

The present invention provides electronic component units obtained by classifying electronic components other than a meter block into the plural integrated electronic component units. A display portion for providing a display according to signals from the electronic component units, a control portion for controlling the electronic component units, and a power supply portion for supplying electric power to the electronic component units are mounted in the meter block. A mounting reference portion is mounted to permit the meter block and the electronic component units to be attached and detached. The electronic component units are controlled and electrically energized via the mounting reference portion.

The present invention also provides electronic component units obtained by classifying electronic components other than a meter block into the plural integrated electronic component units. A display portion in the form of a unit for providing a display according to signals from the electronic component units, a control portion in the form of a unit for controlling the electronic component units, and a power supply portion in the form of a unit for supplying electric power to the electronic component units are mounted in the meter block. A mounting reference portion is mounted to permit the meter block and the electronic component units to be attached and detached. The electronic component units are controlled and electrically energized via the mounting reference portion.

In one feature of the invention, the mounting reference portion assumes a plug-in connector structure between the meter block and the electronic component units and is made of a mother board consisting of a printed wiring board having electric circuitry having a pattern formed by printing of a conductive material.

In another feature of the invention, the mother board forms a plug-in connector structure with a junction box prepared in front of the driver's seat in a vehicle. When the mother board is connected with the junction box, electrical connection of the electronic component units with terminals of sensors, actuators, etc. is completed. The display portion is placed in front of the driver's seat.

BEST MODE FOR CARRYING OUT THE INVENTION

The present invention is hereinafter described, using an embodiment illustrated in the accompanying drawings.

Figure 1:
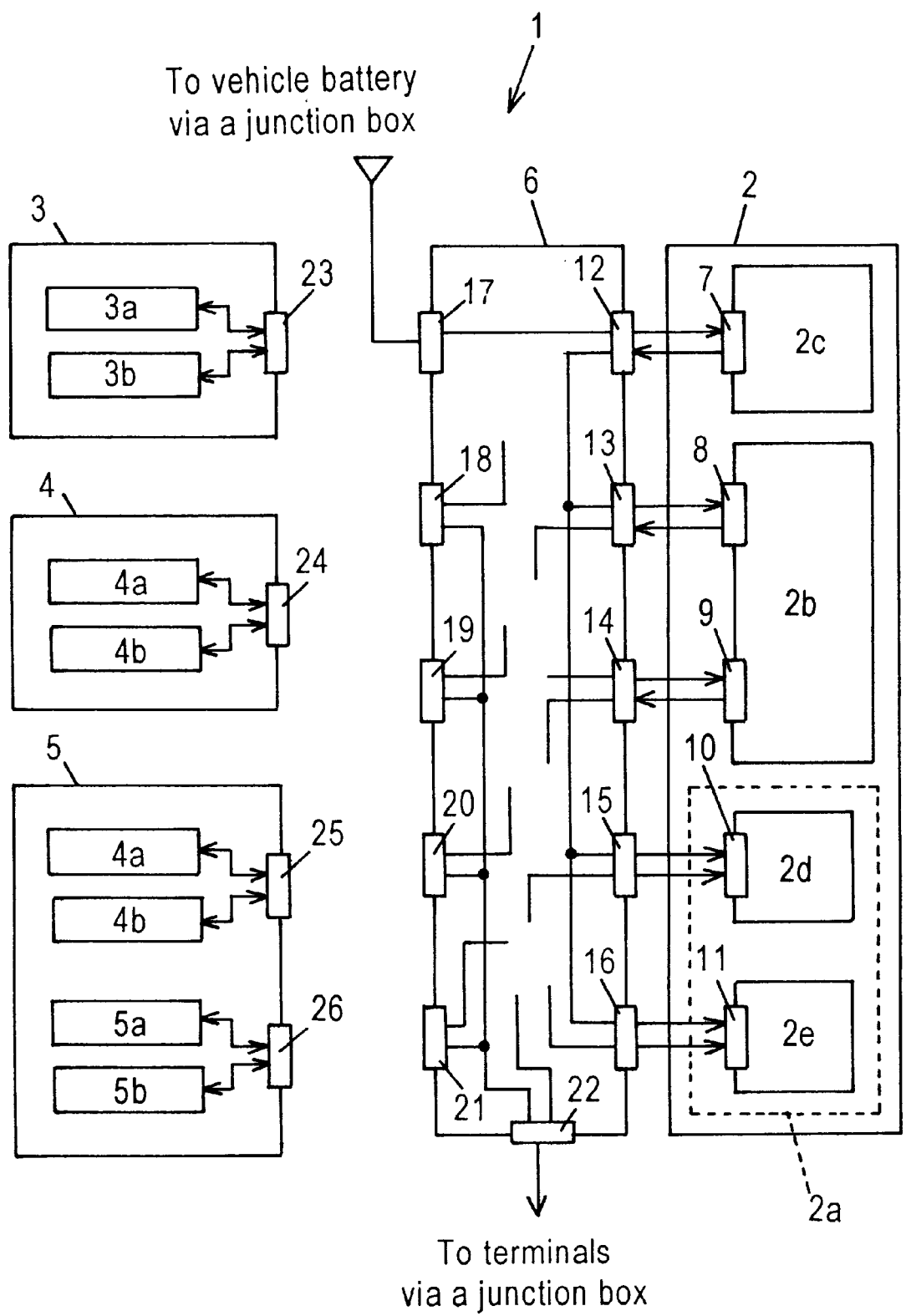
FIG. 1 is a block diagram of an embodiment of the present invention.
Figure 2:
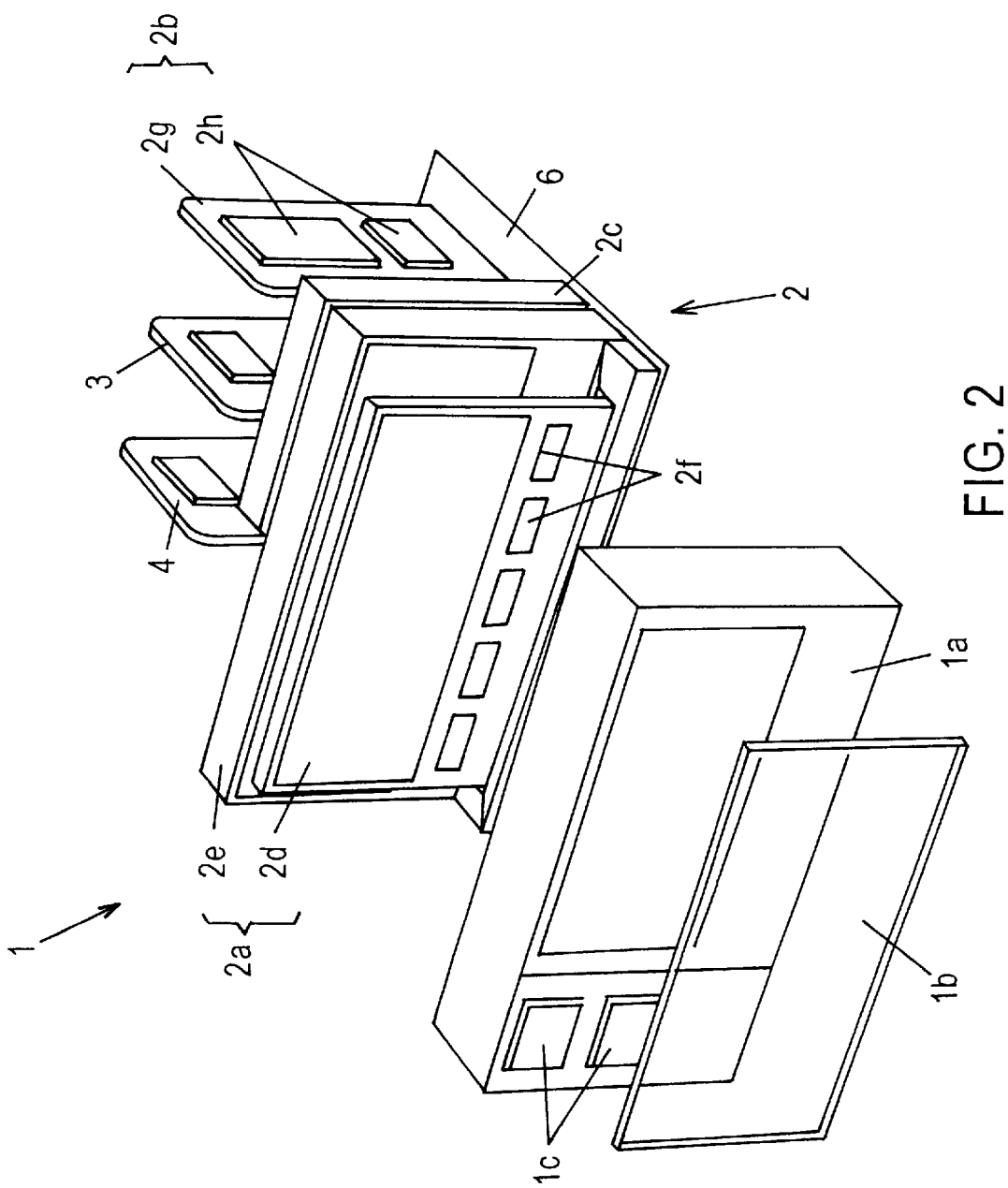
FIG. 2 is a schematic exploded perspective view of the above-described embodiment.

FIG. 1 is a block diagram showing the structure of an embodiment. FIG. 2 is a schematic exploded perspective view of the embodiment. Shown in these figure are a vehicle instrumentation system 1, a meter block 2 forming the vehicle instrumentation system 1, electronic component units 3–5 each having a single function or plural functions integrated, a mounting reference portion 6, and input/output ports 7–26 mounted in a meter block 2, in the electronic component units 3–5, in the mounting reference portion 6 and having a plug-in structure. This mounting reference portion 6 is a mother board consisting of a printed wiring board. A pattern of electric circuitry (not shown) is created by printing a conductive material, and acts to distribute signals and electric power. The mounting reference portion serves as a reference part in mounting the meter block 2 and the electronic component units 3–5. A front case 1a and a rear case (not shown) together form a housing for the vehicle instrumentation system. The mounting reference portion is received inside the front and rear cases. This mounting reference portion is then held to a junction box (not shown) prepared in the dashboard in front of the driver's seat. The front case 1a has a transparent plate 1b permitting visual check of the display portion 2a (described later) and various switches 1c.

The meter block 2 performs the meter function of the vehicle instrumentation system 1, and comprises the display portion 2a for displaying the vehicle speed, the engine speed, and other information, a control portion 2b consisting of a microcomputer for driving and controlling the display portion 2a, and a power supply portion 2c for supplying electric power to these portions 2a, 2b. In the present embodiment, the display portion 2a is composed of a display member 2d and an illuminating member 2e. The display member 2d consists of a display device such as an LCD (liquid crystal display). The illuminating member 2e consists of LEDs (light-emitting diodes), a CCT (cold-cathode tube), or other light-emitting device and acts to backlight the display member 2d. An electronic component 2f such as a driver IC is mounted (chip on glass attachment) on the surface of the display member 2d and built as a unit. The illuminating member 2e is also fabricated as a unit. The control portion 2b in the form of a unit is fabricated by mounting an electronic component 2h (chip on board) such as an IC on a daughter board 2g consisting of a printed wiring board. The power supply portion 2c is fabricated as a unit from an inverter or the like. The display portion 2a (display member 2d and illuminating member 2e), the control portion 2b, and the power supply portion 2c can be separately mounted and replaced by aligning the input/output ports 7–11 of the meter block 2 to the input/output ports 12–16 of the mounting reference portion 6 and connecting them in one touch.

In the present embodiment, plural electronic components are classified and integrated into three electronic component units 3–5, for example. For instance, the electronic component unit 3 integrates various electronic components such as a seat belt warning system, a light turning-off reminding warning system, and a key takeout reminding warning system. The unit 3 has an input circuit 3a and an output circuit 3b. The input circuit 3a comprises interface circuits for the ignition switch, a seat belt switch, a light switch, a door switch, and so on. The output circuit 3b receives electric power from the power supply portion 2c, activates a warning means such as a buzzer, and provides a desired display on the display portion 2a of the meter block 2.

The electronic component unit 4 is an integration of electronic components forming an illuminated entry system and a defogger timer, respectively, and has an input circuit 4a and an output circuit 4b. The input circuit 4a is an interface circuit for a door switch, a defogger switch, or the like. The output circuit 4b is a driver circuit for supplying electric power from the power supply portion 2c to a light source or to a heating coil.

The electronic component unit 5 is an integration of the electronic component unit 4 with an electronic component consisting of a power door lock. The component unit 5 has an input circuit 5a and an output circuit 5b. The input circuit 5a is an interface circuit for a door lock switch, a key cylinder switch, or the like. The output circuit 5b is a driver circuit receiving electric power from the power supply portion 2c and driving the door lock actuator.

These three kinds of electronic component units 3–5 each consist of a daughter board consisting of a printed wiring board on which an electronic component such as an IC is mounted (chip on board) They are appropriately selected in the production lines according to the vehicular specifications for specific climatic areas or the vehicle grade, and are mechanically and electrically connected to the meter block 2 via the mounting reference portion 6.

In the case of the electronic component unit 3, its input/output port 23 is selectively connected to the input/output ports 18–21 of the mounting reference portion 6 in one touch. In the case of the electronic component unit 4, its input/output port 24 is similarly connected to the input/output ports 18–21. In the case of the electronic component unit 5, its input/output ports 25 and 26 are similarly connected to the input/output ports 18–21. Thus, they are mechanically and electrically connected to the meter block 2 via the mounting reference portion 6. FIG. 2 shows the case in which the electronic component units 3 and 4 are mounted to the input/output ports 18 and 19 of the mounting reference portion 6. The input/output port 17 of the mounting reference portion 6 is intended to make an electrical connection with the aforementioned vehicle battery. The input/output port 22 is intended to make an electrical connection with terminals of sensors and actuators that exchange signals with the electronic component units 3–5, using serial multiplexed communications or other means. The input/output ports 17, 22 are connected to input/output ports (not shown) of the junction box in one touch, whereby the electrical connection is completed. At the same time, the display member 2d of the display portion 2a is placed in front of the driver's seat.

Thus, the electronic component units 3–5 are controlled and electrically energized by the control portion 2b and the power supply portion 2c of the vehicle instrumentation system 1 via the mounting reference portion 6. Owing to this structure, it is necessary to prepare only three kinds of electronic component units 3–5. The number of variations can be reduced greatly. This is effective in reducing the cost. In particular, 6 kinds of electronic components are used in the present embodiment. There are two kinds of electronic component units 3, two kinds of electronic component units 4, and one kind of electronic component unit 5. Where at least one kind of electronic component is used according to the vehicular specifications for specific climatic areas or the vehicle grade, there exist 63 combinations (63 variations) of used electronic component units. In the present embodiment, however, there exist only 3 variations. It will be understood that the number of variations is much fewer.

The meter block 2 can be modified according to the variation, since the display portion 2a and the control portion 2b are in the form of a unit and can be replaced. For instance, the display portion 2d of the display portion 2a can be changed from the LCD to other display device such as an FLT (fluorescent tube) or an EL (electric field-emitting device). Where a light-emitting device is used as the display member 2d, the illuminating member 2e can be omitted. In addition, it is possible to cope with-the variations described above by removing the control portion 2b in the form of a unit and rewriting the software.

The control portion 2b discerns the electronic component units 3–5 by monitoring the input/output ports 18–21 of the mounting reference portion 6. In particular, when any one of the electronic component units 3–5 is connected with the mounting reference portion 6, the control portion 2b discerns it by gaining information through the input/output ports 18–21 to which the electronic component units 3–5 are connected. Different information is set for each of the electronic component units 3–5 and stored in memory.

The method of discerning the units is implemented by obtaining information by monitoring the input/output ports 18–21 as described above. Besides, they may be artificially identified by appropriately selecting any one of the electronic component units 3–5 in the production lines and gaining access to the control portion 2b from outside the control portion 2b when or after the selected one is mounted to the mounting reference portion 6. However, the identification method permitting the control portion 2b to identify electronic component units by itself as in the above embodiment contributes greatly to simplification of the production line process.

It is to be understood that the above-described first embodiment merely gives one example of the invention and that the invention is not limited thereto. For example, electronic components classified and integrated as electronic component units 3–5 are not limited to those described in the above embodiment. obviously, the combination may be appropriately selected according to the kind of vehicle.

As described thus far, the components other than the meter block 2 and the mounting reference portion 6 can be made common. By connecting the meter block 2 and the electronic component units 3–5 directly to the mounting reference portion 6, the vehicle instrumentation system 1 can be constructed. In this way, the number of wires can be reduced. Hence, the structure of the vehicle instrumentatin system 1 can be simplified, and the cost can be curtailed.

The meter block 2 and the electronic component units 3–5 are each fabricated as a unit. They can be selectively mounted to the mounting reference portion 6. Consequently, the efficiency at which the vehicle instrumentation system 1 is mounted is improved greatly. It is possible to cope with modification of the variation easily.

Especially, it is easy to accommodate noises by fabricating the electronic component units 3–5 for each individual function. If any one is at fault, the problem can be addressed by replacing only the defective unit. The effects on the others can be reduced to a minimum. In consequence, the reliability of the vehicle instrumentation system 1 can be improved.

INDUSTRIAL APPLICABILITY

In the present invention, a meter block and electronic component units are directly connected to a mounting reference portion to fabricate a vehicle instrumentation system. Therefore, the number of wires can be reduced. In consequence, the structure of the vehicle instrumentation system can be simplified. Also, the cost can be decreased. The efficiency at which the vehicle instrumentation system is mounted or assembled is improved greatly. It is easy to cope with modification of the variation. Especially, noises can be easily addressed, since the electronic component units are built as units for individual functions. If any one unit is at fault, the problem can be solved by replacing only the defective one. The effects on the others can be minimized. Hence, the reliability of the vehicle instrumentation system can be improved. In this way, various advantages arise.

We claim:

1. A vehicle instrumentation system comprising:
   a plurality of electronic component units integrating various electronic components other than a meter block, each of said electronic component units including the electronic components combined in accordance with their functions;
   a display portion for providing a display according to signals from said electronic component units, said display portion being mounted in said meter block;
   a power supply portion for supplying electric power to said electronic component units, said power supply portion being mounted in said meter block; and
   a mounting reference portion for mounting said meter block and said electronic component units so as to allow said meter block and said electronic component units to be attached and detached, said electronic component units being electrically energized via said mounting reference portion.

2. A vehicle instrumentation system comprising:
   a plurality of electronic component units integrating various electronic components other than a meter block, each of said electronic component units including the electronic components combined in accordance with their functions;
   a display portion in the form of a unit for providing a display according to signals from said electronic component units, said display portion being mounted in said meter block;
   a power supply portion in the form of a unit for supplying electric power to said electronic component units, said power supply portion being mounted in said meter block; and
   a mounting reference portion for mounting said meter block and said electronic component units so as to allow said meter block and said electronic component units to be attached an detached, said electronic component units being electrically energized via said mounting reference portion.

3. The vehicle instrumentation system of claim 2, wherein said mounting reference portion is a mother board having a plug-in connector structure for connecting said meter block and said electronic component units.

* * * * *